United States Patent Office 3,192,215
Patented June 29, 1965

3,192,215
O-DIAMIDOBENZENE DERIVATIVES
John Krapcho, Somerset, N.J., assignor to Olin Mathieson Chemical Corporation, New York, N.Y., a corporation of Virginia
No Drawing. Filed Jan. 30, 1963, Ser. No. 255,112
7 Claims. (Cl. 260—253)

This invention relates to bases of the formula (I) 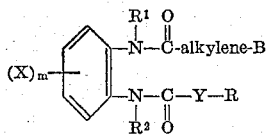

and to acid addition salts and quaternary ammonium salts thereof.

The symbols in Formula I have the following meanings:

B represents a basic nitrogen containing radical of less than 12 carbon atoms.
R represents hydrogen, lower alkyl, cycloalkyl, $(X)_m$-phenyl, furyl, thienyl, pyridyl and piperonyl;
$R^1$ and $R^2$ each represents hydrogen, lower alkyl, lower alkenyl and aralkyl;
X represents hydrogen, halo, lower alkyl, lower alkoxy, lower alkanoyl, trihalomethyl, hydroxy, and nitro;
Y represents lower alkylene, lower alkenylene lower alkynylene and lower alkadienylene; and
m represents 1, 2 and 3.

The lower alkyl groups included in R, $R^1$ and X include straight and branched chain saturated aliphatic groups such as methyl, ethyl, propyl, isopropyl, butyl, isobutyl, t-butyl, amyl, isoamyl, hexyl and the like. Methyl and ethyl are preferred. The lower alkoxy groups contain alkyl groups of the same character attached to the oxygen atom. Similarly, the lower alkylene groups represented by Y are divalent radicals of the same kind. The term "alkylene" includes such straight and branched chain aliphatic groups having up to about 14 carbon atoms, but lower alkylene groups are preferred. The lower alkenyl groups represented by $R^1$ are monounsaturated groups corresponding to the lower alkyl groups and include, for example, propenyl, isopropenyl, butenyl, isobutenyl and the like.

The unsaturated groups represented by Y are divalent straight or branched chain groups containing one carbon to carbon double bond (lower alkenylene), two carbon to carbon double bonds or one carbon to carbon triple bond (lower alkynylene) illustrated by the following:

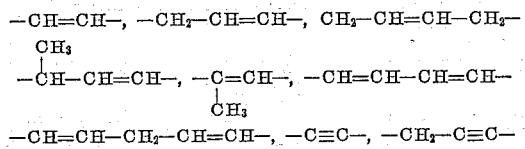

and the like, of which the first is preferred.

Each of the four halogens is contemplated by the terms "halo" and "trihalomethyl," but in the case of the halogens themselves chlorine and bromine are preferred while trifluoromethyl is the preferred trihalomethyl group.

The lower alkanoyl groups represented by X are the acyl moieties derived from lower fatty acids containing alkyl groups of the character described above and include, for example, acetyl, propionyl, butryl and the like.

The cycloalkyl groups represented by R are saturated alicyclic groups, containing preferably 3 to 7 carbon atoms including for example, cyclopropyl, cyclobutyl, cyclopentyl, cyclohexyl and cycloheptyl.

R represents a phenyl group or a phenyl group which contains one to three substituents represented by the symbol X. Illustrative of the substituted phenyl groups are the following: o-, m- and p-chlorophenyl, o-, m- and p-bromophenyl, o-, m- and p-nitrophenyl, 3,4-dinitrophenyl, 2,3-dichlorophenyl, 2,3-dibromophenyl, 3,4-dichlorophenyl, o-, m- and p-hydroxyphenyl, o-, m- and p-tolyl, o-, m- and p-xylyl, mesityl, p-methoxyphenyl, p-ethoxyphenyl, p-acetylphenyl, o-, m- and p-trifluoromethylphenyl, o-, m- and p-trichlorophenyl, 3,4-di(trifluoromethyl)phenyl and the like.

$R^1$ represents aralkyl groups which include mono- and bicyclic hydrocarbon rings attached to alkyl groups especially up to 12 carbon atoms. Preferably, this symbol represents $(X)_m$-phenyl-lower alkyl wherein $(X)_m$-phenyl and lower alkyl are the same as described above and this includes for example, benzyl, phenethyl, nitrobenzyl, chlorobenzyl, bromobenzyl, dichlorobenzyl, methylbenzyl and the like.

The basic nitrogen containing radicals symbolized by B may be represented by the formula (II) 

wherein each $R^3$ represents hydrogen, lower alkyl, hydroxy-lower alkyl, phenyl-lower alkyl and N-(lower alkyl)phenyl(lower alkyl), forming such basic groups as amino, lower alkylamino, e.g., methylamino, ethylamino, di(lower alkyl)amino, e.g., dimethylamino, diethylamino, dipropylamino, (hydroxy-lower alkyl)amino, e.g., hydroxyethylamino, di(hydroxy-lower alkyl)amino, e.g., di(hydroxyethyl)amino, phenyl(lower alkyl)amino, e.g., benzylamino, phenethylamino, N-(lower alkyl)-phenyl (lower alkyl)amino, e.g., N-methylbenzylamino, and the like.

In addition the nitrogen may join with the groups represented by $R^3$ to form a 5 to 7 membered monocyclic heterocyclic containing, if desired, an oxygen, sulfur or an additional nitrogen atom (not more than two hetero atoms altogether), that is, the two symbols $R^3$ represent together tetramethylene, pentamethylene, hexamethylene, oxatetramethylene, oxapentamethylene, azatetramethylene, azapentamethylene, azahexamethylene, thiatetramethylene, or thiapentamethylene. The heterocyclic group may also be substituted by one or two groups represented by X.

Thus heterocyclic groups represented by B include, for example piperidino, (lower alkyl)piperidino, e.g., methylpiperidino, di(lower alkyl)piperidino, e.g., dimethylpiperidino, (lower alkoxy)piperidino, e.g., methoxypiperidino, 2-, 3- or 4-piperidyl, 2-, 3- or 4-(lower alkylpiperidyl), e.g., 2-, 3- or 4-(N-methylpiperidyl), pyrrolidino, (lower alkyl)pyrrolidino, e.g., methylpyrrolidino, di(lower alkyl)pyrrolidino, e.g., dimethylpyrrolidino, (lower alkoxy)pyrrolidino, e.g., ethoxypyrrolidino, 2- or 3-pyrrolidyl, 2- or 3-(N-lower alkylpyrrolidyl) e.g., 2-or 3-(N-methylpyrrolidyl), morpholino, (lower alkyl)morpholino, e.g., N-methylmorpholino or 2-methylmorpholino, di(lower alkyl)morpholino, e.g., 2,3-dimethylmorpholino, (lower alkoxy)morpholino, e.g., ethoxymorpholino, thiamorpholino, (lower alkyl)thiamorpholino, e.g., (N-methylthiamorpholino or 2-methylthiamorpholino, di-(lower alkyl)thiamorpholino, e.g., 2,3-diethylthiamorpholino, 2,3-dimethylthiamorpholino, (lower alkoxy)thiamorpholino, e.g., 2-methoxythiamorpholino, piperazino, (lower alkyl)piperazino, e.g., $N^4$-methylpiperazino, 2-methylpiperazino or $N^4$-ethylpiperazino, di(lower alkyl)-piperazino, e.g., 2,3-dimethylpiperazino, hexamethyleneimino and homopiperazino.

The preferred members of the class defined by Formula I are those wherein X is hydrogen and Y is lower alkylene or lower alkenylene, especially the latter and particularly with 2 or 3 carbon atoms, R is hydrogen or phenyl, especially the latter, $R^1$ is hydrogen or lower alkyl, especially, lower alkyl and methyl in particular, B is di-lower alkylamino, dimethylamino, diethylamino or piperidino, especially, dimethylamino, $m$ represents 1, and the alkylene group has 2 or 3 carbon atoms, especially 2.

The compounds of Formula I may be produced by reacting an o-nitroaniline of the formula (III)
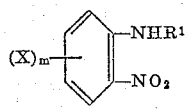

with a haloacyl halide of the formula (IV)
$$\text{hal}-\overset{\overset{\text{O}}{\|}}{\text{C}}-\text{alkylene-hal}$$

which forms an intermediate of the formula (V)
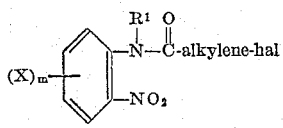

This reaction is preferably effected in an inert organic solvent such as chloroform, benzene, toluene, ether or the like at a temperature from about room temperature to reflux temperature.

The product of Formula V is reacted with an amine of the formula H—B, preferably by heating, e.g., at a temperature up to about reflux, in an inert solvent such as benzene, toluene, etc.

The nitro group is then reduced to the amine group, e.g., by catalytically hydrogenating under pressure in the presence of a metal hydrogenation catalyst such as platinum or palladium.

The o-amino compound thus obtained is finally reacted with a compound of the formula (VI)
$$\text{hal}-\overset{\overset{\text{O}}{\|}}{\text{C}}-\text{Y}-\text{R}$$

preferably in an inert organic solvent such as those described above at room or elevated temperature, e.g., up to about reflux temperature.

This series of reactions yields compounds of Formula I wherein $R^2$ is hydrogen. For the preparation of products of that formula wherein $R^2$ is other than hydrogen, a modification of the above procedure is required. In that instance, the amino compound obtained by reduction of the intermediate of Formula V after reaction with the amine is interacted with an aldehyde of the formula (VII) $\qquad R^2$—CHO This yields an intermediate of the formula (VIII)
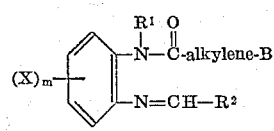

On treatment with sodium borohydride or by catalytic hydrogenation, this intermediate is reduced to (IX)
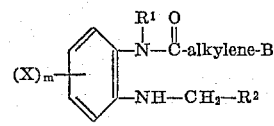

The final step, reaction with VI, is the same as that described above.

The symbols in all of the above formulas have the same meaning and hal refers to halogen, preferably chlorine or bromine.

The bases of Formula I form acid addition salts by reaction with the common inorganic and organic acids. Such inorganic salts as the hydrohalides, e.g., hydrobromide, hydrochloride, hydroiodide, sulfates, nitrates, phosphates, borates, etc., and organic salts as acetate, oxalate, tartrate, malate, citrate, succinate, benzoate, pamoate, ascorbate, salicylate, theophyllinate, camphorsulfonate, alkanesulfonate, e.g., methanesulfonate, arylsulfonate, e.g., benzenesulfonate, toluenesulfonate and the like are also within the scope of the invention. It is frequently convenient to effect the purification of the product by forming the acid salt. The base may be obtained therefrom by neutralization with an alkali hydroxide such as sodium hydroxide.

The bases of Formula I also form quaternary ammonium salts, e.g., lower alkyl halides such as methyl chloride, methyl bromide, ethyl chloride, etc., lower alkyl sulfates such as methyl sulfate, ethyl sulfate, etc., monocyclic aryl (lower alkyl) halides and sulfates such as benzyl chloride, benzyl sulfate, etc. This is accomplished by reacting the base with the alkyl halide, sulfate, or the like.

The compounds of this invention are therapeutically active substances which possess serotonin inhibitory and hypotensive activities. They are useful in the treatment of conditions such as hypertension. They may be administered orally or parenterally in the form of tablets, capsules, elixirs, injectables or the like by incorporating the appropriate dosage of the base of Formula I or a physiologically acceptable acid addition salt or quaternary ammonium salt thereof in a conventional vehicle according to accepted pharmaceutical practice.

The following examples are illustrative of the invention. All temperatures are expressed on the centigrade scale.

EXAMPLE 1

*2'-(3-dimethylaminopropionamido)cinnamanilide, hydrochloride*

(A) PREPARATION OF 2'-NITRO-3-CHLOROPROPIONANILIDE

A solution of 276 g. of o-nitroaniline in 1.5 l. of benzene is treated with a solution of 127 g. of 3-chloropropionyl chloride in 200 ml. of benzene. The temperature of the reaction mixture rises from 27° to 43° during a period of thirty minutes. The mixture is maintained at 40–45° for one hour and allowed to stand overnight at room temperature. The heavy yellow precipitate (o-nitroaniline hydrochloride) is filtered and washed with benzene. The filtrate is washed with 500 ml. cold water and the organic phase dried over magnesium sulfate. After removal of the major portion of the benzene by distillation under reduced pressure, the residue begins to crystallize and is diluted with 500 ml. of hexane and cooled. The pale yellow product is filtered and dried, yield: 199 g., M.P. 84–86°. After crystallization from 230 ml. of absolute alcohol, the product weighs 194 g., M.P. 86–88°.

(B) PREPARATION OF 2'-NITRO-3-DIMETHYLAMINOPROPIONANILIDE

A solution of 68.5 g. of material from part A in 200 ml. of acetone is added to a solution of 46.5 g. of sodium iodide in 200 ml. of acetone. The mixture is refluxed for three hours and the solvent is removed under reduced pressure. The residue (2'-nitro-3-iodopropionanilide) is treated with 500 ml. of water and then extracted with 300 ml. portions of ether (four times). The ether extracts are combined, dried over magnesium sulfate, filtered and concentrated to a volume of about 500 ml. This solution is cooled and treated with a cold solution of 118 g. of dimethylamine in 500 ml. of benzene. This solution is allowed to stand at room temperature for four days, then refluxed for four hours and concentrated to about one-half of the original volume. The residue is cooled and extracted with a solution of 30 ml. of conc. hydrochloric acid in 500 ml. of water. The aqueous phase is cooled and treated with a cold solution of 30 g. of sodium hydroxide in 100 ml. of water. The liberated base is extracted with 300 ml. portions of ether (four times) and the combined extracts dried over magnesium sulfate. After evaporation of the solvent, the yellow oil weighs 49.5 g.

(C) PREPARATION OF 2'-AMINO-3-DIMETHYLAMINO-PROPIONANILIDE

A solution of 24.0 g. of the material from part B in 200 ml. of absolute alcohol is treated with a slurry of 5 g. of 5% palladium-carbon in 50 ml. of absolute alcohol and the mixture placed in a hydrogenation apparatus under 55 pounds of hydrogen. The theoretical quantity of hydrogen is consumed in ten minutes. The mixture is filtered and the filtrate is concentrated under reduced pressure. The residue is diluted with 200 ml. of hexane and the product allowed to crystallize: yield 30.5 g., M.P. 78–80°. After crystallization of this material from 100 ml. of benzene-100 ml. of hexane, the colorless product weighs 17.5 g., M.P. 80–82°.

(D) 2'-(3-DIMETHYLAMINOPROPIONAMIDO)CINNAMANILIDE HYDROCHLORIDE

A solution of 25.0 g. of material from part C in 200 ml. of chloroform is cooled to 15° and treated with a solution of 20.2 g. of cinnamoyl chloride in 100 ml. of chloroform (over a five minute period) while maintaining the temperature at 15–20°. A precipitate separates from the mixture. After stirring for two hours at room temperature, the mixture is refluxed for thirty minutes, cooled and diluted with 600 ml. of ether to give 45.2 g. of nearly colorless product, M.P. 162–169°. Crystallization of 35 g. of this material from 400 ml. of methanol gives 22 g. of colorless product, M.P. 186–189°. After recrystallization from acetonitrile, the colorless product melts at 193–195°. Neutralization with dilute sodium hydroxide gives the free base.

EXAMPLE 2

*2'-(2-dimethylaminoacetamido)cinnamanilide hydrochloride*

By substituting an equivalent quantity of α-chloroacetyl chloride for the 3-chloropropionyl chloride in part (A) of Example 1, 2'-(2-dimethylaminoacetamido)cinnamanilide hydrochloride is prepared.

EXAMPLE 3

*2'-(3-piperidinopropionamido)cinnamanilide hydrochloride*

By substituting an equivalent quantity of piperidine for the dimethylamine in part (B) of Example 1, 2'-(3-piperidinopropionamido)cinnamanilide hydrochloride is obtained.

Similarly by substitution of the dimethylamine in part (B) of Example 1 by N-methylphenethylamine, morpholine and 1-methylpiperazine, there is obtained, respectively, 2'-[3-(N-methylphenethylamino)propionamido]cinnamanilide hydrochloride, 2'-(3-morpholinopropionamido)-cinnamanilide hydrochloride and 2'-[3-(4-methylpiperazino)propionamido]cinnamanilide hydrochloride.

EXAMPLE 4

*2'-(3-dimethylamino-N-methylpropionamido)cinnamanilide hydrochloride*

By substituting an equivalent quantity of N-methyl o-nitroaniline for the o-nitroaniline in part (A) of Example 1, 2'-(3-dimethylamino-N-methylpropionamido)cinnamanilide hydrochloride is obtained.

EXAMPLE 5

*5'-chloro-2'-(3-dimethylaminopropionamido)cinnamanilide hydrochloride*

By substituting an equivalent quantity of 4-chloro-2-nitroaniline for the o-nitroaniline in part (A) of Example 1, 5'-chloro-2'-(3-dimethylaminopropionamido)cinnamanilide hydrochloride is obtained.

EXAMPLE 6

*2'-(3-dimethylaminopropionamido)crotonanilide hydrocloride*

By substituting an equivalent quantity of crotonyl chloride for the cinnamoyl chloride in part (D) of Example 1, 2'-(3-dimethylaminopropionamido)crotonanilide hydrochloride is obtained.

Similarly by substituting for cinnamoyl chloride in part (D) of Example 1, acetyl chloride, benzoyl chloride, hexahydrobenzoyl chloride, phenacetyl chloride, sorbyl chloride, phenylpropionyl chloride, α-propylcinnamoyl chloride and furoyl chloride gives, respectively, 2'-(3-dimethylaminopropionamido)acetanilide hydrochloride, 2'-(3-dimethylaminopropionamido)benzanilide hydrochloride, 2'-(3-dimethylaminopropionamido)hexahydrobenzanilide hydrochloride, 2'-(3-dimethylaminopropionamido)phenacetanilide hydrochloride, 2'-(3-dimethylaminopropionamido)sorbanilide hydrochloride, 2'-(3-dimethylaminopropionamido)phenylpropiolylanilide hydrochloride, 2'-(3-dimethylaminopropionamido)-α-propylcinnaminilide hydrochloride and 2'-(3-dimethylaminopropionamido)furanilide hydrochloride.

EXAMPLE 7

*2'-(3-dimethylaminopropionamido)-3,4,5-trimethoxycinnamanilide hydrochloride*

By substituting an equivalent quantity of 3,4,5-trimethoxycinnamoyl chloride for the cinnamoyl chloride in part (D) of Example 1, 2'-(3-dimethylaminopropionamido)-3,4,5-trimethoxycinnamanilide hydrochloride is obtained.

EXAMPLE 8

*2'-(3-dimethylaminopropionamido)cinnamanilide methochloride*

A solution of 10.0 g. of material from part (D) of Example 1 in 100 ml. of water is treated with a solution of 1 g. of sodium carbonate in 10 ml. of water. The base is extracted with 100 ml. portions of ether (three times) and the ether extracts dried over magnesium sulfate. The solvent is evaporated and the residue is dissolved in 100 ml. of acetonitrile, cooled and treated with 10 g. of methyl chloride. After standing for one day at room temperature, the solution is diluted with 500 ml. of ether to give a crystalline product.

What is claimed is:

1. A compound of the group consisting of a base of the formula $$(X)_m \begin{array}{c} \phantom{X} \\ \phantom{X} \end{array} \begin{array}{c} R^1 \; O \\ | \; \; \| \\ -N-C-\text{alkylene-B} \\ -N-C-Y-R \\ | \; \; \| \\ R^2 \; O \end{array}$$

wherein

R represents a member of the group consisting of hydrogen, lower alkyl, cycloalkyl of 3 to 7 carbon atoms, $(X)_m$-phenyl, furyl, thienyl, pyridyl and piperonyl, $R^1$ and $R^2$ each represents a member of the group consisting of hydrogen and lower alkyl, X represents a member of the group consisting of hydrogen, halo, lower alkyl, lower alkoxy, lower alkanoyl, trihalomethyl, hydroxy and nitro, Y represents a member of the group consisting of lower alkylene, lower alkenylene, lower alkynylene and lower alkadienylene, B represents a basic nitrogen containing radical of the group consisting of amino, lower alkylamino, di(lower alkyl)amino, (hydroxy-lower alkyl)amino, di(hydroxy-lower alkyl) amino, phenyl(lower alkyl)amino, N-(lower alkyl)phenyl (lower alkyl)amino, piperidino, (lower alkyl)piperidino, di(lower alkyl)piperidino, (lower alkoxy)piperidino, piperidyl, (lower alkylpiperidyl), pyrrolidino, (lower alkyl)pyrrolidino, di(lower alkyl)pyrrolidino, (lower alkoxy)pyrrolidino, pyrrolidyl, (N-lower alkylpyrrolidyl), morpholino, (lower alkyl)morpholino, di(lower alkyl)morpholino, (lower alkoxy) morpholino, thiamorpholino, (lower alkyl)thiamorpholino, di(lower alkyl)thiamorpholino, (lower alkoxy) thiamorpholino, piperazino, (lower alkyl) piperazino, di(lower alkyl)piperazino, hexamethyleneimino and homopiperazino, and *m* represents an integer from 1 to 3, and physiologically acceptable acid addition salts and quaternary ammonium salts of said base.

2. A compound of the formula

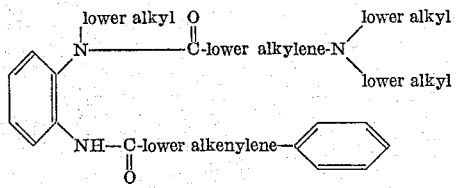

3. A physiologically acceptable acid addition salt of a compound of claim 2.

4. A compound of the formula

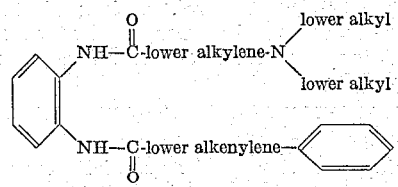

5. 2',(3-dimethylaminopropionamido)cinnamanilide.
6. 2'-(2-dimethylaminoacetamido)cinnamanilide.
7. 2 - (3 - dimethylaminopropionamido) - N - methylcinnamanilide.

References Cited by the Examiner
UNITED STATES PATENTS
2,991,290  7/61  Shapiro et al. _____ 260—562 XR OTHER REFERENCES
Carelli et al.: Am. Chim. (Rome), vol. 51, pages 707–712 (1961).

IRVING MARCUS, *Primary Examiner.*
NICHOLAS S. RIZZO, *Examiner.*